United States Patent [19]

Kobayashi et al.

[11] Patent Number: 5,389,737
[45] Date of Patent: * Feb. 14, 1995

[54] PANEL FOR FREE ACCESS TO SIGNAL CABLE AND POWER CABLE

[75] Inventors: Hiroshi Kobayashi; Tsuguhiro Hirose; Hideaki Haruyama, all of Tokyo; Jiro Kano, Kawasaki; Katsunari Kodachi, Tokyo; Yoshio Kojima, Yokohama; Humio Takeda, Hachioji; Toshihiko Muro, Yokohama, all of Japan

[73] Assignee: Kabushiki Kaisha Toshiba, Kawasaki, Japan

[*] Notice: The portion of the term of this patent subsequent to Sep. 17, 2008 has been disclaimed.

[21] Appl. No.: 680,379

[22] Filed: Apr. 4, 1991

Related U.S. Application Data

[60] Division of Ser. No. 394,161, Aug. 14, 1989, Pat. No. 5,049,700, which is a continuation of Ser. No. 608,120, May 8, 1984.

[30] Foreign Application Priority Data

May 13, 1983 [JP] Japan ................... 58-83619
Aug. 18, 1983 [JP] Japan ................... 58-150497

[51] Int. Cl.⁶ .................................................. E04B 5/58
[52] U.S. Cl. ................................................. 174/48; 52/263
[58] Field of Search ................... 174/48, 49; 52/220, 52/221, 126.2, 126.5, 126.6, 263

[56] References Cited

U.S. PATENT DOCUMENTS

| | | | |
|---|---|---|---|
| 2,867,301 | 1/1959 | Benton | 52/263 |
| 3,310,712 | 3/1967 | Paddock | 174/153 GX |
| 3,784,042 | 1/1974 | Hadfield et al. | 174/48 X |
| 4,016,357 | 4/1977 | Abrahamsen | 174/48 |
| 4,053,701 | 10/1977 | Ogilvie et al. | 174/48 |
| 4,085,557 | 4/1978 | Tharp | 52/263 |
| 4,207,660 | 6/1980 | Flachbarth et al. | 174/48 |
| 4,239,316 | 12/1980 | Spaulding | 439/552 X |
| 4,289,923 | 9/1981 | Ebert | 174/65 G |
| 4,296,574 | 10/1981 | Stephens | 52/263 X |
| 4,596,095 | 6/1986 | Chalfant | 52/126.8 |
| 4,631,879 | 12/1986 | Kobayashi et al. | 52/221 X |

FOREIGN PATENT DOCUMENTS

| | | | |
|---|---|---|---|
| 0142997 | 5/1985 | European Pat. Off. | |
| 0142998 | 5/1985 | European Pat. Off. | |
| 1203342 | 10/1965 | Germany | 174/48 |

OTHER PUBLICATIONS

"Catalog of Floor for Office Room", Shoden.
R. B. Wheeler et al., Modular Raised Floor, Nov. 1969, IBM Technical Disclosure, vol. 12, No. 6, p. 827.

*Primary Examiner*—Leo P. Picard
*Assistant Examiner*—David A. Tone
*Attorney, Agent, or Firm*—Oblon, Spivak, McClelland, Maier & Neustadt

[57] ABSTRACT

A panel for free access to a signal cable and a power cable is installed on the floor of an office room and forms a network of signal cables in an office. The posts of this panel are mounted on the floor. A floor plate is secured to the upper ends of the posts. A rack plate is arranged between the floor plate and the floor, and the rack plate is secured to the posts. The height of the floor plate and the rack plate is adjusted by adjusting the engaging position by rotating a leg to be engaged with the threaded holes of the posts. The floor plates are composed of a plate made of glass, reinforced cement mixed with foamable styrol or an aluminum honeycomb structure. The rack plate is composed of a transparent polypropylene plate. Further, the surface of the floor plate is covered with a surface material such as a carpet. The signal cables are arranged in the space between the floor plates and the rack plates. The power cables are arranged in the space between the rack plates and the floor. Electronic components are mounted on the rack plates. Therefore, the power cables, the signal cables and the other electronic components are completely isolated from each other, and the modification of the layout of office automation equipment can be readily carried out by an authorized person.

4 Claims, 7 Drawing Sheets

FIG. 11
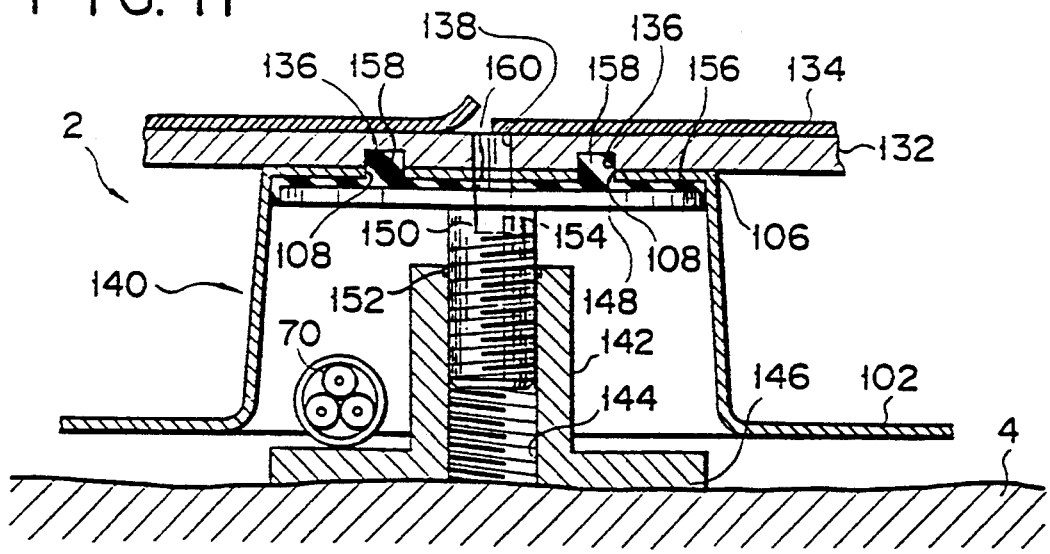
FIG. 12
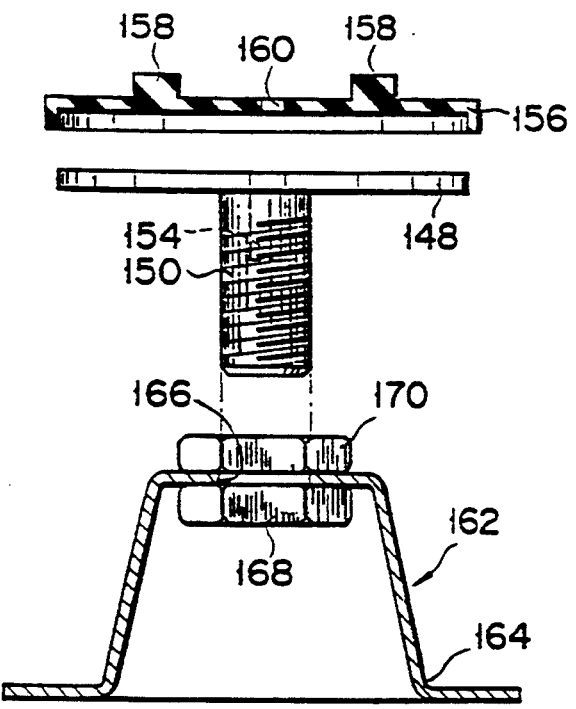
FIG. 13

PANEL FOR FREE ACCESS TO SIGNAL CABLE AND POWER CABLE

This is a division of application Ser. No. 07/394,161, filed on Aug. 14, 1889, now U.S. Pat. No. 5,049,700, which is a continuation of Ser. No. 06/608,120, filed May 8, 1984, now abandoned.

BACKGROUND OF THE INVENTION

The present invention relates to a panel which allows free access to a signal cable, and to a power cable which is capable of arranging the signal cable, and which is located along with other electronic components under the surface of a floor of an office or a computer room.

As microelectronics has been recently developed, a number of office automation apparatuses have been installed in an office. Data communication can be executed at a high speed such as 10 Mbit per second through transmission cables such as coaxial cables and optical fibers between a plurality of work stations, file units of a large capacity, and between printers. It is necessary to form a local area network by laterally and longitudinally arranging signal cables of these main lines, such as the coaxial cables and the optical fibers, in the office. This is also true in a computer room in which computers have been installed.

When office automation equipment is installed, cables might be accidentally disconnected. In order to prevent such a problem, that is to prevent any delays due to the disconnection of the cables, and to enhance the reliability of the equipment, electronic components such as couplers, transceivers and modems are arranged in the vicinity of the main cables. Lead cables are wired from these electronic components, connecting the office automation equipment and the main line cables. On the other hand, when a variety of office automation equipment is employed, a large amount of electric power, as well as a large number of plug sockets are required. A great deal of labor is necessary to install these signal cables, power cables and electronic components. The installation of these cables and components must also permit modifications in the layout of the equipment.

In order to permit future modifications to be made, a free access floor is usually installed in a computer room. On this free-access floor, floor panels of 30 to 45 cm are mounted at an interval of approx. 15 to 30 cm from the surface of the floor (slab), and signal cables and power cables are arranged in the space between the floor panel and the slabs. However, when the conventional free-access floor is employed in an office, the position of the electronic components is restricted so as to avoid contact with the cables. In the cables arrangement, unreasonable forces tend to be applied to the electronic components, thereby causing damage to the components themselves and problems when the components contact the power cables. Therefore, the installation of the signal cables, power cables and electronic components is restricted by laws and regulations, and further, installation can only be executed by authorized specialists. When the layout of the equipment needs to be modified, a large amount of work is required for each installation. As described above, since the installation work requires special knowledge, the user cannot modify the layout of the office automation equipment himself.

SUMMARY OF THE INVENTION

It is an object of the present invention to provided a panel which allows free access to a signal cable, and to a power cable that permits the signal cables, power cables and other electronic component to be safely and easily laid out, and that permits the layout of equipment in an office to be readily modified.

According to the present invention, there is provided a panel which allows free access to a signal cable and a power cable installed in a foundation structure such as a floor, a wall or a ceiling. Electronic components, arranged in a room, are connected to the signal cable which is comprised of: a plurality of posts mounted on the foundation; a first panel member supported by said posts; and a second panel member arranged between the first panel member and the foundation which is supported by the posts in such a manner that the signal cable is arranged in the first space formed between the first panel member and the second panel member, that the power cable is arranged in the second space formed between the second panel member and the foundation structure, and that the electronic components are installed on the second panel member in the first space.

In accordance with the present invention, the signal cable and the power cable are isolated from one another and are respectively laid out in the first and second spaces. Therefore, it is possible to dispose the signal cable irrespective of the arrangement of the power cable. Since only weak current flows generally in the signal cable, the signal cable can be laid out without the authorized specialist as stipulated by the law. Consequently, modification of the layout can be readily carried out by workers already in the office merely by removing the first panel member. Further, since the signal cable can be removed for each panel, modification in the layout of the office automation equipment can be readily and rapidly performed. As the power cable is isolated from the signal cable and the other electronic components, the usual legal restrictions regarding the shielding or grounding of the signal cable and the electronic components do not apply. Thus, the signal cable can be simply laid out, and the cost of installation can be decreased. Since the electronic components can be simply secured to the second panel member, an unreasonable force is not applied to the electronic components in the case of modifying the network, and the reliability of the network can be maintained. As the cables and the electronic components are all contained under the panel, the external appearance of the office room can be improved, and troubles caused by tripping or becoming entangled with the cables and thereby disconnecting them can be prevented.

BRIEF DESCRIPTION OF THE DRAWINGS

FIG. 11 is a partial side sectional view of the second embodiment;

FIG. 12 is a side view showing a modified example of the post;

FIG. 13 is a partial view of the knockout unit;

DETAILED DESCRIPTION OF THE PREFERRED EMBODIMENTS

Figure 1:
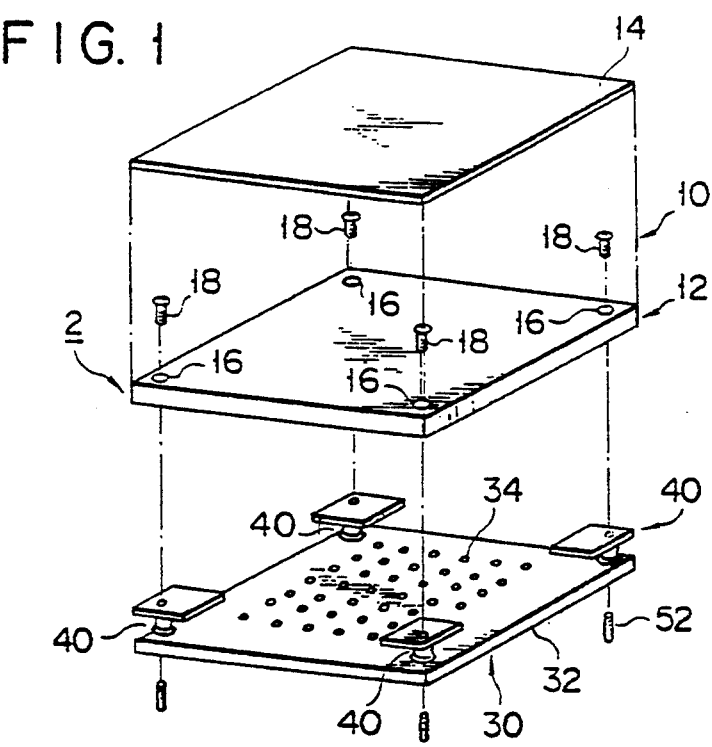
FIG. 1 is an exploded perspective view of a panel according to a first embodiment of the present invention.
Figure 2:
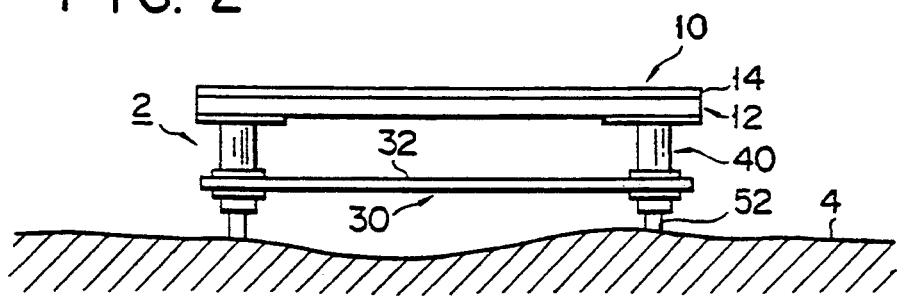
FIG. 2 is a side view of the first embodiment in the installed state.
Figure 3:
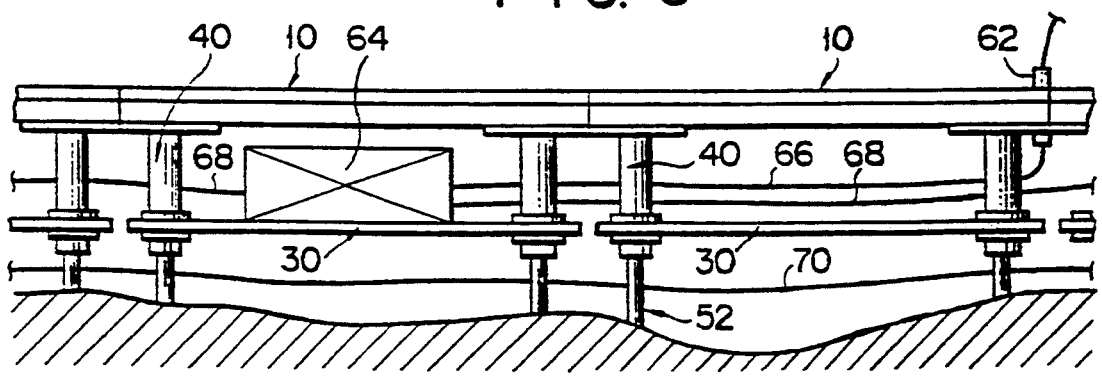
FIG. 3 is a side view showing panels applied to a floor.

FIGS. 1 to 6 show a panel 2 for free access embodied as a floor panel according to a first embodiment of the present invention. This panel 2 has a floor member 10, a rack member 30 and posts 40. The floor plate 12 of the floor member 10 is formed in a shape which can be easily produced and transported such as a square of 50×50 cm. This floor plate 12 is formed in a honeycomb structure of glass reinforced cement as will be described later. A surface material 14 of a peelable surface member is bonded to the upper surface of the floor plate 12. A rack plate 32 of a rack member 30 is formed of an insulating material such as an asbestos plate, a polypropylene plate, a vinyl chloride plate or a vinyl steel plate. Since polypropylene is transparent, permitting the cables under the polypropylene plate to be visually observed, and since polypropylene has sufficient strength and is inexpensive, it is preferred as the material for the rack plate 32 When a vinyl steel plate is used, members disposed on the upper and lower surfaces of the rack plate 32 can be electromagnetically shielded. A plurality of through holes 34 is perforated in a matrix shape in the rack plate 32. These holes 34 are used to fixedly secure electronic components or signal cables to the rack plate 32. The posts 40 are respectively fixed to the four corners of the rack plate 32. Through holes 16 are formed at the four corners of the floor plate 12, and the floor member 10 is secured to the posts 40 by respectively engaging bolts 18 through the holes 16 on the posts 40.

Figure 4:
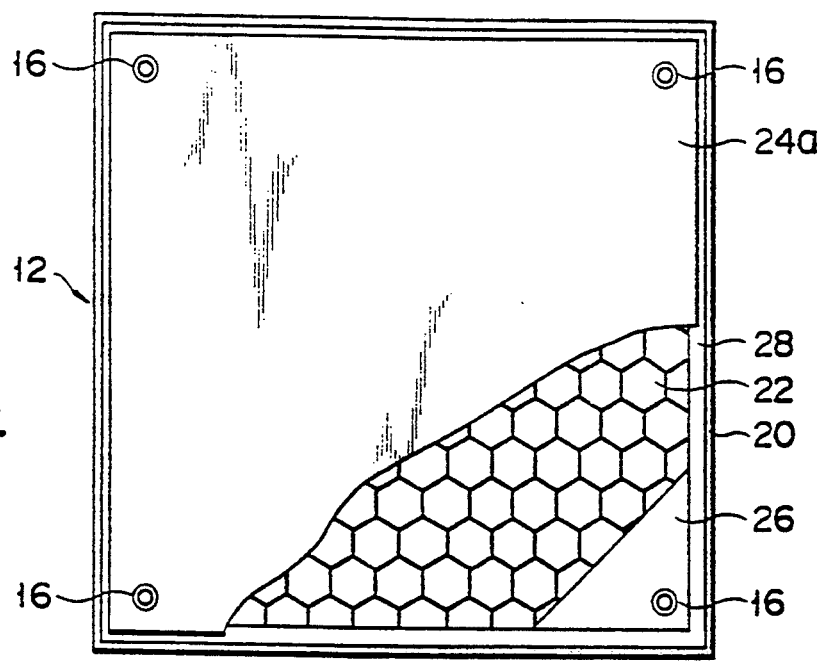
FIG. 4 is a plan view of the floor plate.
Figure 5:
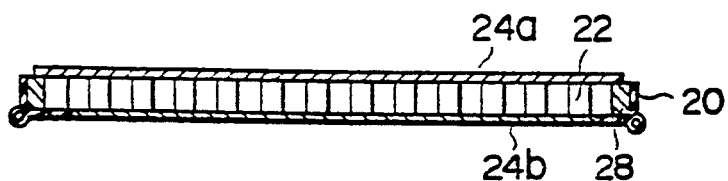
FIG. 5 is a side view of the floor plate of FIG 4.

Referring now to FIGS. 4 and 5, the floor member 10 will be described in more detail. The surface material 14 may be any normal type of covering such as vinyl tile, carpet, or a rug, as desired.

Figure 6:
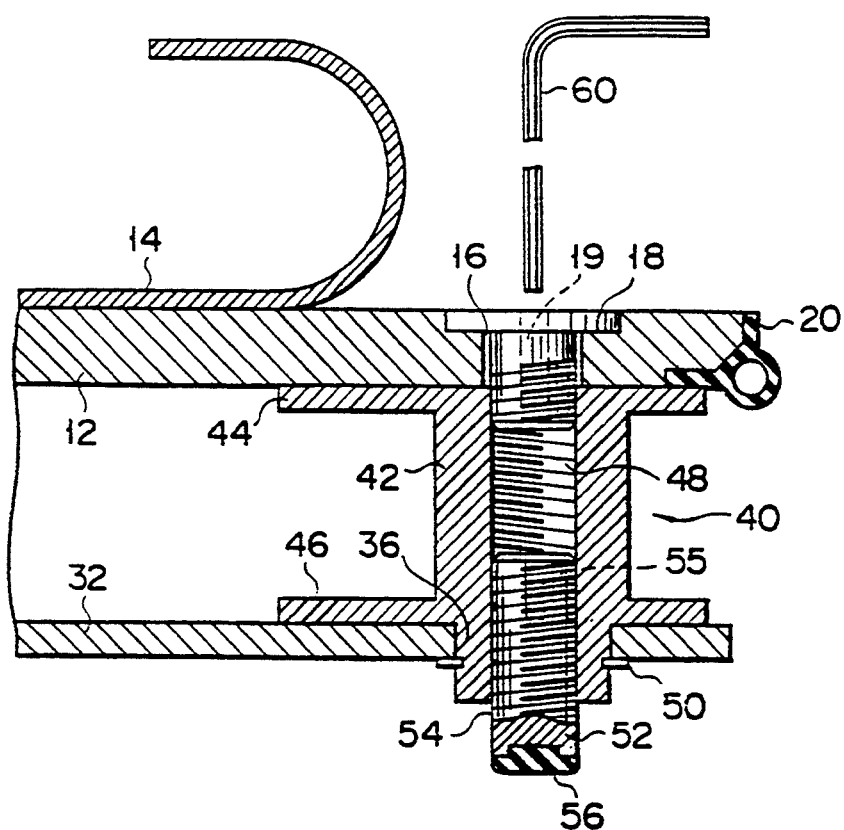
FIG. 6 is a side section view showing a panel.

The floor plate 12 has a frame 28 which extends along the four sides of a square. A honeycomb structure 22 made of aluminium or asbestos is arranged on the zone surrounded by the frame 28 except for the four corners. Reinforcing plates 26 formed, for example, of triangular polypropylene plates are respectively arranged at the four corners of the zone surrounded by the frame 28. Coating plates 24a, 24b made of aluminium having a thickness, for example, of 1 to 2 mm are bonded to the honeycomb structure 22, the reinforcing members 26 and to both sides of the frame 28 to cover the honeycomb structure and the reinforcing members. A packing material 20 formed substantially in an L shape is bonded to the outer side surface of the frame 28. As shown in FIG. 6, a cylindrical hollow portion is formed in the bent part of the packing material 20. When the floor panel 2 is laid out on a floor in an office, the hollow portion of the packing material 20 is elastically deformed to seal the adjacent floor plates 12. Thus, the seal prevents water from seeping below the floor plates 12 during cleaning or when water is accidently spilled on the floor. The packing material having a projection is mounted on one of the adjacent floor plates 12. Packing material having a recess is mounted on the other. Both packing materials may be sealed by the engagement of the projection with the recess of the packing materials. Further, such a projection and a recess are respectively formed on the floor plates themselves and may be similarly engaged to seal the floor plates.

The post 40 has, as shown in FIG. 6, a cylindrical post part 42, a pedestal 4A and a flange 46 respectively formed at the upper and lower ends of the post part 42. A threaded hole 48 is coaxially formed in the post part 42. The bolt 18 is screwed into the hole 48. A post-shaped leg 52, formed on the threaded part 54 on the peripheral surface, is screwed into the hole 48. A rubber member 56 is secured to the lower end of the leg 52. The post 40 is inserted at the lower part of the flange 46 into the through hole 36 perforated at each of the four corners of the rack plate 32, and is clamped by a stop ring 50 so that the flange 46 is superposed on the rack plate 32. The leg 52 is inserted into the hole 48 from the floor plate 12 side by inserting a hexagonal wrench into the through hole 19 formed at the center of the bolt 18 which can be rotated by engaging the hexagonal recess 55 formed on the head of the leg with the wrench. The post 40 and the leg 52 may be, for example, made of a cast material such as iron or aluminium, or of inexpensive insulating ceramics or synthetic resin.

The floor panel 2 thus constructed as described above is laid out on the floor (base plate) 4 in the office room as follows. The posts 40 are first secured by the stop rings 50 to the rack plates 32, respectively. The floor plates 12 of the floor member 10 are then placed on the posts 40, and the floor plates 12 are secured by the bolts 18 to the posts 40. The legs 52 are then engaged with the holes 48 of the respective posts 40. In this case, the engaging positions of the respective posts 52 are adjusted by a hexagonal wrench 60 inserted through the holes 19 so that the floor plates 12 become horizontal, and the projecting lengths from the post parts 42 are adjusted. If a hole 19 is not formed at the bolt 18, the leg 52 is rotated by the wrench 60 before the bolt 18 is secured to the post 40, and the rack plate 32 is set to a horizontal position. Thus, a plurality of floor panels 2 formed in two stages are installed so that the floor members 10 of the adjacent floor panels 2 are contacted with one another to cover the floor 4. Packing material 20 is used to seal the floor plates 12 of the floor members 10.

In this manner, the average height formed by the floor panels 2 laid out on the floor 4 is, for example, about 100 mm. In this case, a lower space of 20 mm is formed between the floor 4 and the rack plate 32. On the other hand, an upper space of 50 mm in height is formed between the rack plates 32 and the floor plates 12. Cable removing jigs 62 are installed by the utilization of notches formed at the specific floor plates 12 at predetermined positions of the floor members 10 laid out as described above. Network main line cables 68 such as optical fibers and coaxial cables are installed in the upper space between the floor plates 12 and the rack plates 32. Electronic components 64 such as couplers, transceivers and modems are installed on the rack plates 32, and are secured by the utilization of the holes 34. Lead-in cables 66 are connected to the respective components 64, introduced on the floor plates 12 through the jigs 62, and connected to the appropriate office automation equipment, respectively. Power cables 70 are laid out in the lower space between the floor 4 and the rack plates 32. Power plug sockets (not shown) are led from the power cables 70 and are laid on the predetermined floor plates 12 or rack plates 32.

According to the floor panel thus constructed as described above, the signal cables and the power cables are respectively installed in the upper and lower spaces to be separated from each other. Therefore, the signal cables can be disposed irrespective of the arrangements of the power cables. Since only a weak current generally flows in the signal cable, the signal cable can be installed without the authorized specialist stipulated by the law. Consequently, the layout of the network can be arbitrarily modified easily and at any time by merely removing the floor plates 12. Since the signal cable can be removed for each panel, the cable can be readily and rapidly modified according to the layout of the office automation equipment. As the power cable is isolated from the signal cable and the other electronic components, legal restrictions regarding shields or the grounding of the signal cable and the electronic components do not apply. Thus, the installation of the signal cable can be simplified, and the cost can be reduced. Since the electronic components can be simply secured to the rack plates, unreasonable forces are not applied to the components when modifying the network, and the reliability of the network can be maintained. As the cables and the electronic components can all be contained under the floor panel, the external appearance of the office room can be improved, and problems caused by tripping over cables and disconnecting them can be prevented. The installation of the power cable should be necessarily carried out by authorized specialists. However, specialists are not necessary when modifying the network as power source plug sockets are initially mounted at predetedmined positions on the rack plates or floor plates when installing the power cables. Therefore, the modification of the power cable can be readily achieved by the office workers themselves rather than by authorized specialists. Since the floor plates 12 are mainly composed of a honeycomb structure 22, the plates 12 have a sufficiently high strength (load resistance) per unit thickness. As a triangular reinforcing member 26 is installed at the connecting portion of the floor plate 12 to the post 40, the floor plates 12 have sufficient strength. The floor plates 12 have excellent flame resistance and insulation as well as low cost. Generally, the load strength in the office is 300 kg/m$^2$, and in order to reduce the height of the floor so as to increase the space above the floor, the thickness of the floor plate is required to be decreased. Further, the floor plate is required to have light weight, excellent flame resistance and insulation. The floor plate 12 of the honeycomb structure constructed according to this embodiment can satisfy these requirements.

Figure 7:
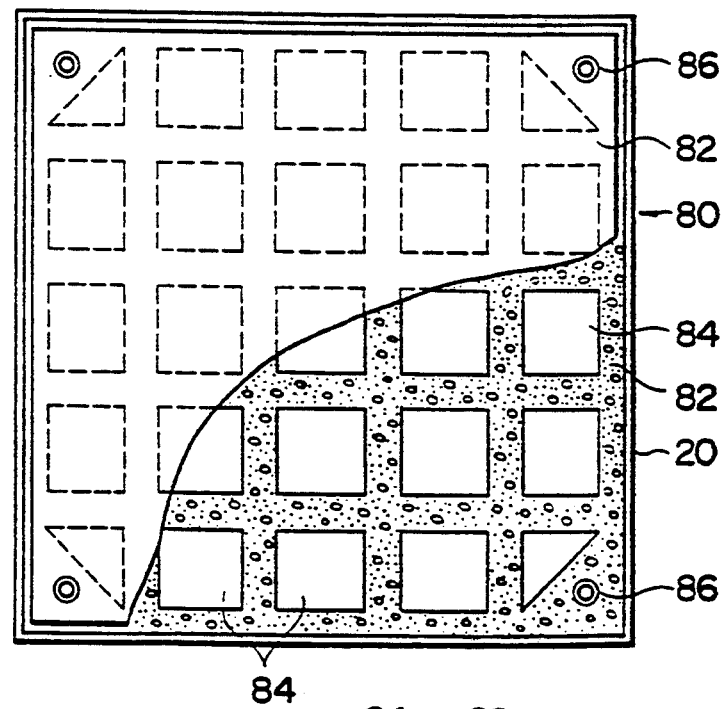
FIG. 7 is a top view of a modified floor plate.
Figure 8:
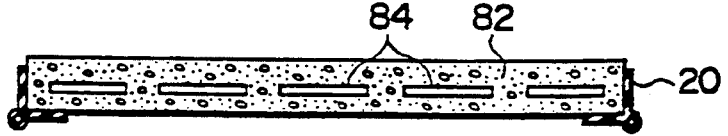
FIG. 8 is a side sectional view showing the floor plate of FIG. 7.

Next, a modified example of the floor plate will be described with reference to FIGS. 7 and 8. In a floor plate 80, a plate 82 made of glass reinforced cement (hereafter abbreviated as "GRC") mixed and reinforced with glass fiber is buried with a plurality of plate-shaped foamable styrol units 84 in a matrix shape. Holes 86 are respectively formed at the four corners as in the floor plate 12 at the floor plate 80, and a waterproof packing material 20 is provided at the side edges.

These GRC floor plates 80 have a high load strength per unit thickness. The floor plate 80 has excellent flame resistance and insulation, and is enviromentally safe. The packing material 20 also exhibits the above-described waterproof effect, and prevents the base plate 82 from notching at the end. The styrol unit 84 prevents the plate 82 from slacking and has the effect of deadening sound. This floor plate 80 can be readily manufactured by a casting mold.

Figure 9:
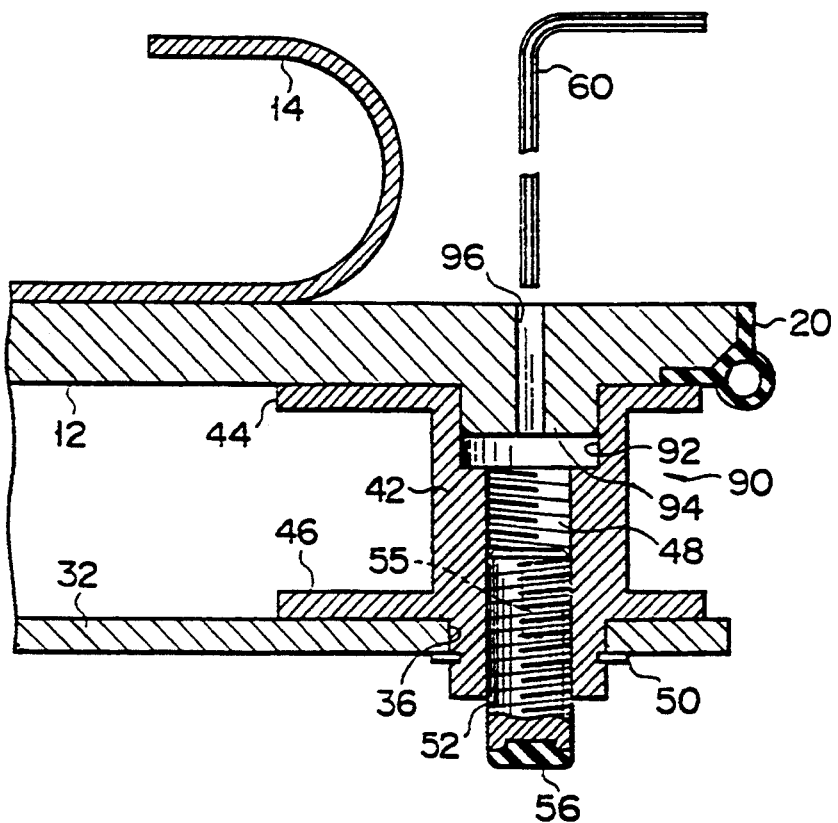
FIG. 9 is a side sectional view showing a modified example of the post.
Figure 10:
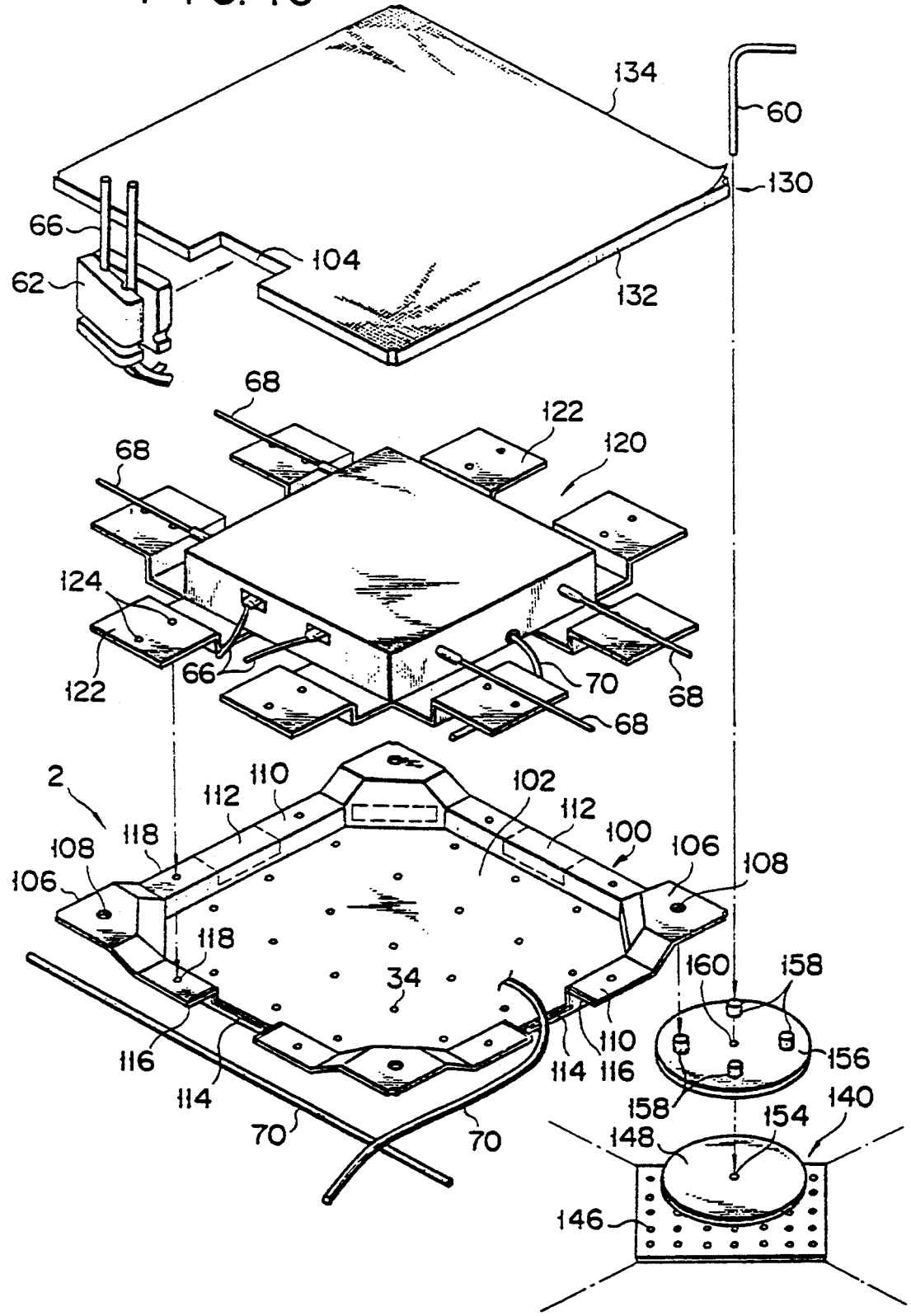
FIG. 10 is an exploded perspective view of a floor panel according to second embodiment of the present invention.

The modified example of the post will now be described in detail with reference to FIG. 9. This post 90 has substantially the same structure as the post 40 except that a rectangular or circular recess 92 is formed on the upper end formed with a flange 44, and the same reference numerals are designated for the same parts and components, and so will not be described. A rectangular or circular projection 94 is formed on the lower surface of each of four corners of the floor plate 12. A through hole 96 is perforated at the position which matches the hexagonal recess 55 of a leg 52 which is engaged with a threaded hole 48 at the projection 94. In the post 90, the projection 94 of the floor plate 12 is first engaged with the recess 92 of the post 90. Then, the projection is then inserted into the recess by inserting the hexagonal wrench 60 into the threaded hole 48 through the hole 96. The leg 52 is then rotated by the wrench 60 so as to adjust the height of the floor panel.

As regards the post 90 described above, the floor plate 12 is not bolted to the post 90. Therefore, the floor plate 12 can be readily removed, thereby facilitating the installation of the signal cables. Surface material 14 is prevented from dropping into the hole 96 by setting the diameter of the hole 96 to be the same size or smaller than the thickness of the surface material 14 so that the external appearance of the floor is not damaged. Even if the surface material 14 is of a soft vinyl tile which can be readily lifted up from the floor, the presence of the holes 96 cannot be visually observed from the surface material 14. Thus, the external appearance is not deteriorated. When a hard surface material is used, the adjustment of the position of the leg 52, or the mounting or dismounting of the floor plates 12 may be performed after the surface materials have been removed. When the portions of the positions to be matched to the holes 96 of the surface material 14 are constructed to be detachable, the position of the leg 52 can be even more readily adjusted.

A normal screwdriver may be used instead of the hexagonal wrench 60 as means for rotating the leg 52. Since the floor plate 12 can be laid out to contact both the adjacent floor plates 12 and the packing materials 20 in an office, no depressions in the floor occur even if the projections 94 of the floor plates 12 are merely engaged with the recesses 92 of the posts 90.

Another embodiment of the present invention will now be described in detail with reference to FIGS. 10 to 13. This second embodiment is different from the first embodiment shown in FIGS. 1 to 6 in that rack plates 100 are formed in a structure having stepped stages. Thus, the entire height of the floor plate can be reduced. The rack plate 100 has a flat rack portion 102 on which an electronic component 120 is installed. Duct portions 110 are formed to be raised from the rack portion 102 at its four sides, and stationary portions 106 are formed to be further raised from the duct portions 110 at the four corners of the rack portion 102. This rack plate 100 may be obtained stepwise by pressing a plate insulated on its surface such as a vinyl steel plate. The stationary portion 106 is higher than the duct portion 1}0, and the duct portion 110 is higher than the rack portion 102. The duct portion 110 is in parallel with the side of the rectangular rack plate 100, but the stationary portion 106 crosses at the end of the side substantially at an angle of approximately 45°. Through holes 108 for securing the rack plate 100 are respectively formed at the stationary portions 106. A plurality of holes 34 is perforated for securing the electronic component 120 at the rack portion 102. A knockout part 112 is formed at the long part approximately one-third from the center of the duct portion 110. This knockout part 112 may be readily removed from the duct portion 110. When the knockout part 112 is removed from the duct portion 110, a notch 114 is formed at the part which as occupied by the knockout part 112. A rubber bush 116 is mounted in this notch 114, thereby preventing the coating of a cable passing through the notch 114 from being damaged by the edge of the notch 114. It should be noted that a notch 114 is formed prior to the knockout part 112 and that a clogging plate may be engaged with the notch not used for inserting the cable.

A floor member 130 has a floor plate 132 and a surface material 134 such as a carpet bonded onto the floor plate 132. The floor plate 132 installed at a predetermined position in an office is formed with a rectangular notch 104 at the center of one of the sides thereof. A removing jig 62 for removing a lead-in cable 66 above the floor member 130 is engaged with the notch 104. The floor plate 132 is installed on the rack plate 100. As shown in FIG. 11, the four corners of the floor plate 132 are respectively superposed on the stationary portions 106. A cylindrical recess 136 is formed at the position to be matched to the hole 108 of the floor plate 132. A notch 138 is formed at the end of each of the corners of the floor plate 132.

The floor plates 132 and the rack plates 100 are supported by posts 140. The post 140 has a support 142 formed at the lower end with a supporting plate 146 to be secured to the floor 4. A threaded hole 144 which extends substantially perpendicularly to the supporting plate 146 is formed at the center of the support 142. A threaded rod 150 which crosses perpendicularly a disc-shaped pedestal 148 is secured to the lower surface of the pedestal 148. This rod 150 is engaged with the hole 144 to be supported by the support 142. The height of the pedestal 148 can be adjusted by screwing the rod 150 into or out of the threaded hole 144. A recess 154 of a hexagonal section to be engaged with a hexagonal wrench 60 which is opened at the upper surface is formed at the center of the pedestal 148. A ring 152 is interposed between the holes 144 and the rod 150. This ring 152 is formed of Teflon resin for locking the rotation of the pedestal 148 so that the pedestal 148 may not accidentally rotate. A cover 156 made of hard rubber covers the upper surface of the pedestal 148. This cover 156 can be rotated by a predetermined frictional force retained by the pedestal 148. Four cylindrical projections 158 are respectively formed at equal intervals along the circumference of the circle at the central part of the upper surface of the cover 156. Holes 160 are perforated at the central portion of the cover 156.

A signal main line cable 68 is connected to the electronic component 120, and a power cable 70 is connected to the electronic component 120. A heat sink plate 122 made of a material having high thermal conductivity is provided at the component 120, and the plate 122 is secured to the duct portion 110 through the holes 124 formed at the plate 122 and the holes 118 formed at the duct portions 110.

In the floor panel thus constructed as described above, posts 140 are disposed on the floor 4 in a matrix shape, and the supporting plates 146 are secured onto the floor. The projections 158 of the cover 156 of the posts 140 are respectively engaged with the holes 108 of the stationary portion 106 of the rack plate 100. The projections 158 are projected slightly upward from the stationary portions 106. The projected parts of the projections 158 are respectively engaged with the recesses 136 of the floor plates 132. The floor panels 2 are laid out on the floor in-the office by engaging the projections 158 with the holes 108 and the recesses 136. Electronic components 120 are secured through the holes 34 on the rack portion 102 of the rack plate 100 at predetermined positions. The plates 122 are secured to the duct portions 110. Removing jigs 62 are mounted on the floor plates 132 by engaging the floor plates 132 with the notches 62.

Then, the corners of the surface material 134 are folded and wound up, and engaged with the hexagonal recesses 154 of the pedestal 158 through the holes 138 and 160. The height of the floor plates 130 and the rack plate 10 is adjusted by rotating the pedestal 148 with the hexagonal wrench 60. In this case, the cover 156 rotates to slide the pedestal 148. The height of the floor plate 130 can be maintained at the adjusted position since the loosening of the rod 150 is prevented by the ring 152.

The power cable 70 attached to the electronic component 120 is led out under the rack plate 100 by removing the knock part 112 at the suitable position of the rack plate 100, by mounting the bush 116 in the notch 114 and by passing it through the notch 114. The power cables 70 are laterally and longitudinally arranged in the space between the duct portion 110 and the floor. The power cables 70 cross under the stationary portion 106. In this case, since the stationary portion 106 is disposed to be higher than the duct portion 110, the power cables 70 can be crossed and arranged in the rack plate 100 in a sufficient margin. As the end of the stational portion 106 crosses at a 45° angle the longitudinal direction of the duct portion 110, the power cable 70 can be smoothly bent at the position of the stationary portion 106. The power cable 70 can also be led out on the floor member 130 through the notch 114 and the removing jig 62. A plug socket member is engaged with the notch of the floor plate 132 as will be described later, and the power cable 70, which rises to the rack plate 100 through the notch 114, may be connected to this plug socket.

A main line cable 68 is wired through a relatively narrow space between the duct portion 110 and the floor plates 132. On the other hand, the lead-in cable 66 may be led above the floor plates 120 through the jig 62. The heat of the electronic component 120 may be transmitted through the duct portion 110 to the rack plate 110, and dissipated from the electronic component 120.

In the floor panel 2 thus constructed as described above, an electronic component 120 of a relatively large size is arranged in the large space formed between the rack portion 102 and the floor plates 132. The power cable 70 is arranged or wired between the duct portion 110 and the floor 4. The main-line cable 68, as a signal cable, is wired through the space between the duct portion 110 and the floor plates 132. Therefore, even in this embodiment, since the power cable is isolated from the signal cable in the arrangement, similar effects to the embodiments in FIGS. 1 to 9 can be performed, and a network can be formed by effectively utilizing of the space between the floor plates 132 and the floor in the office room. In other words, the electronic components and the power cables are arranged to be isolated in a horizontal direction by the duct portion 110. Consequently, the height of the floor member 130 needs only to be set to the height required for the thickness of the electronic component 120, which is different from the case where the power cable is arranged under the electronic components as in the embodiments shown in FIGS. 1 to 9. Therefore, when the ceiling of the office room is low as when this floor panel is, for example, installed in an existing office, the floor panel of this embodiment is particularly effective. The heat of the electronic component 120 can be dissipated through the plate 122 to the rack plates 100. Further, the plates of the electronic components installed on the adjacent rack plates are secured to each other, and the connecting strength of the rack plates 100 may be accordingly enhanced.

A post 162 as shown in FIG. 12 may be used instead of the post 140. A support 164 of this post 162 is formed in a hat shape by pressing, and a through hole 166 is formed at the center. A nut 168 to be engaged with a threaded rod 150 of a pedestal 148 is secured at the center to the lower surface of the support 164. A clamping nut 170 is engaged with the rod 150, and the rod 150 is then engaged with the nut 168. After the height of the pedestal 148 is adjusted, the nut 170 is clamped to the support 164. Thus, the pedestal 148 is secured to the support 164.

Since a burr remains at the cut portion when a knockout part 112 is formed, it is necessary to mount a bush 116 so as to prevent damage to the cable. However, the influence of the burr may be avoided by forming a boundary between the knockout part 112 and the duct portion 110 as shown in FIG. 13. In other words, a cylindrical projected part 174 is formed at a predetermined position at the edge of the knockout part 112, and a connecting part 172 with the duct portion 110 is formed at the end of the projected part 174. The burr remaining at the connecting part 172 after the knockout part 112 is formed does not damage the cable by forming the notch between the duct portion 110 and the knockout part 112 in this manner since the burr is concealed in the circular recess of the duct portion 110. Therefore, it is not necessary to mount the bush 116.

In the embodiments described above, one post 140 supports the four corners of the floor panel 2. However, four posts may be formed to support the floor plate and the rack plate in each floor panel in the same manner as the embodiments shown in FIGS. 1 to 9. Further, the installation of the floor panel and the wiring of the cables can be facilitated even when the strength of the rack plates 100 is weak by forming a hole in which a leg can be pressed at the center of the rack portion 102 of the rack plate 100.

Figure 14:
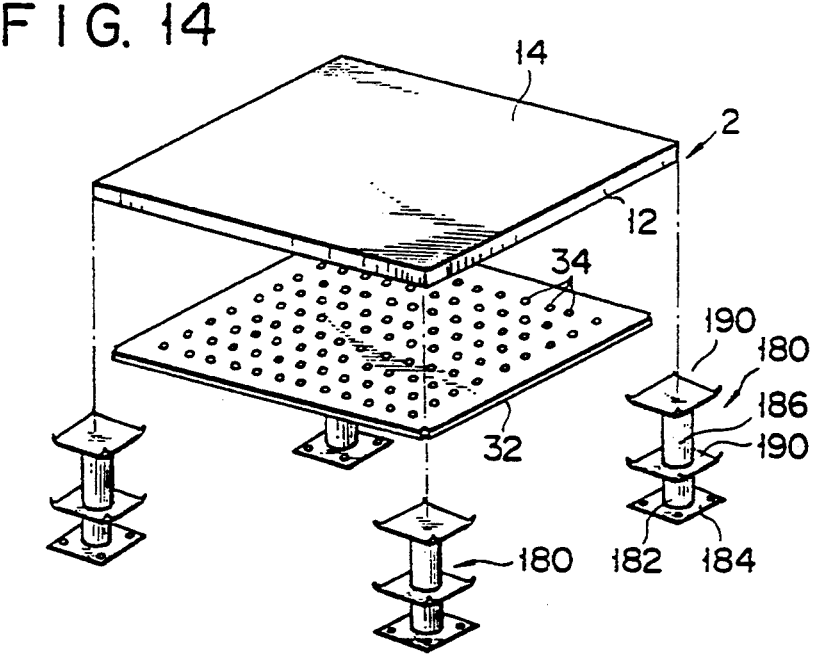
FIG. 14 is an exploded perspective view of a floor panel according to third embodiment of the present invention.
Figure 15:
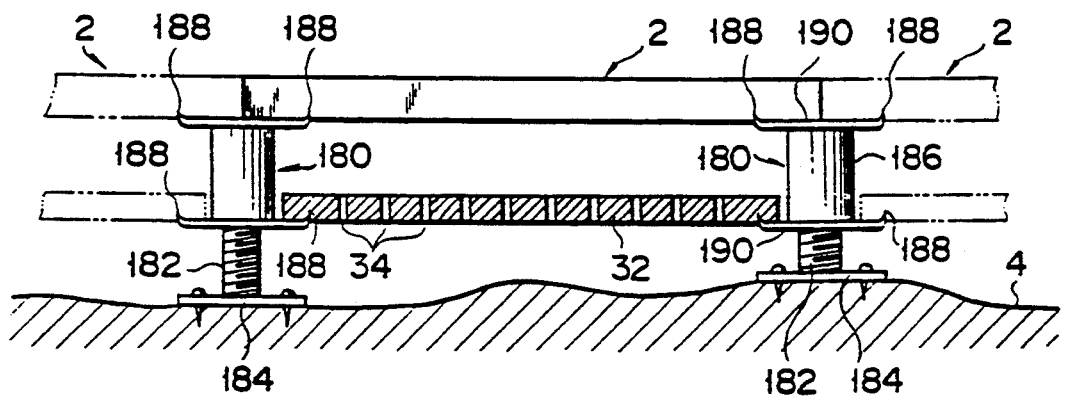
FIG. 15 is a side view of the third embodiment.
Figure 16:
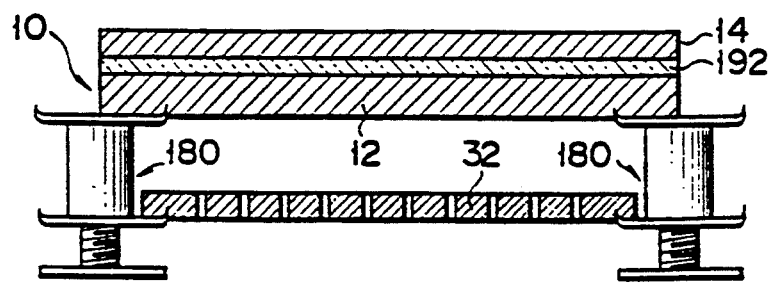
FIG. 16 is a side view of a modified example.

Next, still another embodiment of the present invention will now be described with reference to FIGS. 14 to 16. In this embodiment, a corner of each of floor panels 2 is supported by one post 180. The structure of this embodiment except for the post 180 is constructed in the same manner as in the embodiments shown in FIGS. 1 to 9, the same reference numerals are designated for the same parts and components, and will be omitted for the description. The post 180 has a support 182 and a pedestal 186. The flange 184 of the support 182 is secured by pins to a floor 4. The support 182 is threaded, and the pedestal 186 is engaged with the threads of the support 182, and the height of the pedestal 186 may be adjusted by rotating the pedestal 186 on the support 182. Flanges 190 are formed rotatably to the pedestal 186 at the pedestal 186. Pawls 188 are respectively formed at four corners of the respective flanges 190. In the post 180 constructed as described above, four floor plates 12 and rack plates 32 of the floor panel 2 are placed on one post 180. The floor plates 12 and the rack plates 32 are respectively engaged by the pawls 188 of the flanges at the upper and lower stages.

In order to form a floor that is soundproof or heat resistant, a soundproof material or an insulation material, respectively, may be arranged in the space between the floor plates and the rack plates or in the space between the rack plates and the floor. As shown in FIG. 16, sheets of an insulation material or a soundproof material 192 are interposed between the floor plates 12 and the surface materials 14 of the floor members 10, causing the floor to have a three-layer structure.

Figure 17:
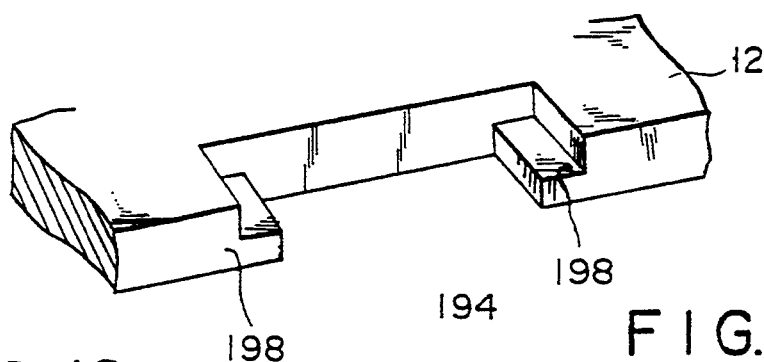
FIGS. 17 to 20 are perspective views showing a method of removing the cable.
Figure 18:
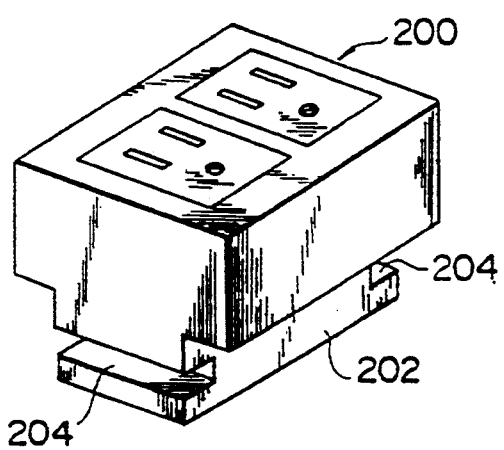
Figure 19:
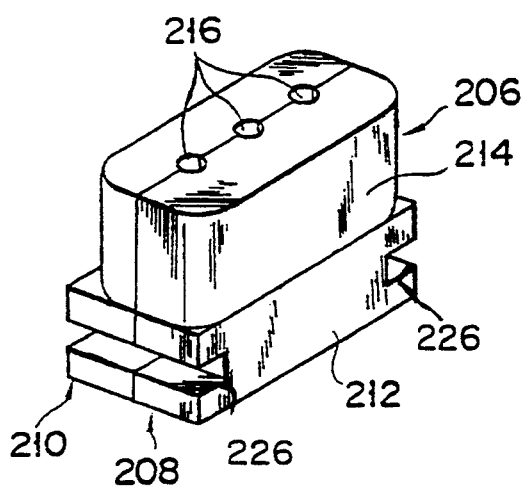
Figure 20:
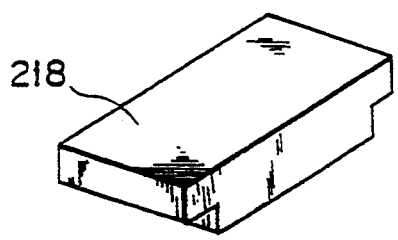
Figure 22:
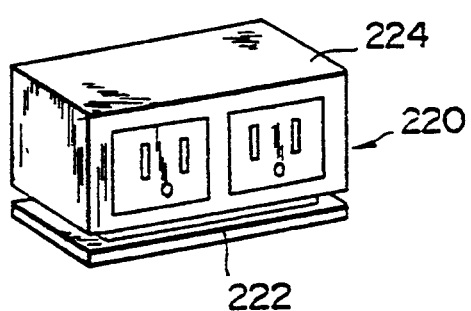
FIGS. 21 and 22 are perspective views showing a modified example of the method.
Figure 21:
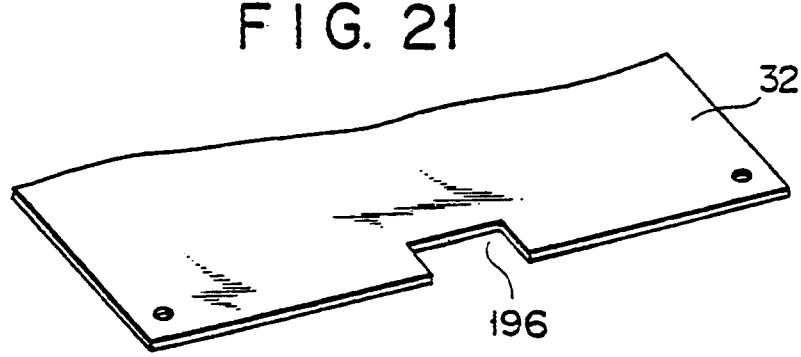

In order to remove the power cable or the signal cable above the floor panel or the rack member, the element shown in FIGS. 18 and 19 may be installed. In order to mount these elements on the floor plates 12 and the rack plates 32, notches 194 (FIG. 17) and 196 (FIG. 21) are respectively formed at the floor plate 12 and the rack plate 32. Furthermore, the notch 194 has two projections 198 extending toward each other from the opposing sides of the notch 194. A power source plug socket 200 has a connecting portion 202 The portion 202 has, in its opposing sides, two grooves 204 for holding the projections 198 of the notch 194. The plug socket 200 can be mounted on the floor plate 12 by the grooves 204 holding the projections 198 of the notch 194. A pull-out jig 206 of a signal cable shown in FIG. 19 has a structure substantially similar to the pull-out jig 62 shown in FIG. 10, and has split units 208 and 210. The jig 206 has an upper mount 214 and a lower mount 212. The mount 214 has three through holes 216, in which signal cables are inserted. The mount 211 has, in its opposing side, two grooves 226 for holding the projections 198 of the notch 194. The pull-out jig 206 can be mounted on the floor plate 12 by the grooves 226 holding the projections 198 of the notch 194. Signal cables are set to the holes 216 so that the split units 208 and 210 are separated. The units 208 and 210 are then superposed, and the mount 211 holds the projections 198. When neither the power source plug socket 200 not the pull-out jig 62 is mounted on the floor notch cover 12, a plate 218 may be engaged with the notch 194. Since the mount 214 of the jig 206 is projected upwardly from the floor plate 12, the possibility of water being accidentally introduced under the floor panel through the holes 216 as when cleaning the floor is eliminated. The power plug socket is mounted at an arbitrary position of the floor plane by using this element, and the signal cable may be removed from the arbitrary position. The power plug socket 220 has a plug socket body 224 in which the inserting port of the plug is directed laterally, and a mount 222 is formed at the lower end of the body 224. This mount 222 is engaged with the notch 196 of the rack plate 32. The plug socket 220 is mounted on the rack plate 32. The electronic component to be installed on the rack plate 32 may be energized by using the plug socket 220. Therefore, the installing position of the electronic components can be readily modified without altering the arrangement pattern of the power cables between the rack plates and the floor.

The embodiments of the present invention are as described above. The present invention is not limited to the particular embodiments described above. Various changes and modifications may be made within the spirit and scope of the present invention. For example, a plurality of rack plates are provided, and water pipes, gas pipes or ducts or pipes for room cooling or heating may be arranged in addition to the signal cables and the power cables in the spaces between the floor plates and the uppermost rack plates, between the rack plates, and between the lowermost rack plates and the floor.

The panel of the present invention may not be limited to being mounted on the floor, but may also be installed on the walls or ceiling of an office.

What is claimed is:

1. A free access floor panel comprising a plurality of panel plates each having the same shape, forming a space to permit an electrical cable to be arranged between a floor and the panel plates, and being laid on the floor to form a floor surface, the free access floor panel comprising:
   each of the plurality of panel plates having a notch portion provided with a projection portion formed in a side portion of the panel plate in order to permit the electrical cable to be led from an arbitrary position of the floor surface;
   a blind plate engageable with the notch portion and mountable so as to form a flat surface with the panel plate surface; and
   a peelable surface member bonded to the panel plate on which the blind plate is mounted.

2. A free access floor panel comprising a plurality of panel plates each having the same shape, forming a space to permit an electrical cable to be arranged between a floor and the panel plates, and being laid on the floor to form a floor surface, the free access floor panel comprising:
   each of the plurality of panel plates having a notch portion provided with a projection portion formed in a side portion of the panel plate in order to permit the electrical cable to be led from an arbitrary position of the floor surface;
   a plug socket having a groove portion for holding the projection portion and mountable in the notch portion so that a terminal of the plug socket is exposed to the panel plate surface;
   a blind plate engageable with the engaging portion of the notch portion and mountable so as to form a flat surface with the panel plate surface when the plug socket is not mounted in the notch portion; and
   a peelable surface member bonded to the panel plate on which the blind plate is mounted.

3. A free access floor panel comprising a plurality of panel plates each having the same shape, forming a space to permit an electrical cable to be arranged between a floor and the panel plates, and being laid on the floor to form a floor surface, the free access floor panel comprising:
   each of the plurality of panel plates having a notch portion provided with a projection portion formed in a side portion of the panel plate in order to permit the electrical cable to be led from an arbitrary position of the floor surface;
   a cable lead-out component having a groove portion for holding the projection portion and mountable in the notch portion to permit the electrical cable to be led out onto the panel plate;
   a blind plate engageable with the projection portion of the notch portion and mountable so as to have the same surface as that of the panel plate surface when the cable lead-out component is not mounted in the notch portion; and
   a peelable surface member bonded to the panel plate on which the blind plate is mounted.

4. A free access panel, provided with a panel plate supported on a floor through a post and constituting a floor surface, a wall surface, or a ceiling surface, the free access panel comprising:
   the post having:
     a first member provided in contact with a floor;
     a second member for supporting the panel plate and for defining a height of the supporting position against the floor of the panel plate by threadably engaging with the first member; and
   the panel plate being provided with an insertion hole for a tool for adjusting the supporting position by changing the degree of the threadable engagement between the first and the second members constituting the post, and the degree of the threadable engagement is adjusted by a relative torsional rotation between the first and second members given by the tool inserted through the insertion hole provided with the panel plate.

* * * * *